C. D. CHANDLER AND F. B. ROLAND.
HEADLIGHT.
APPLICATION FILED DEC. 16, 1920.
1,403,291.
Patented Jan. 10, 1922.
2 SHEETS—SHEET 2.
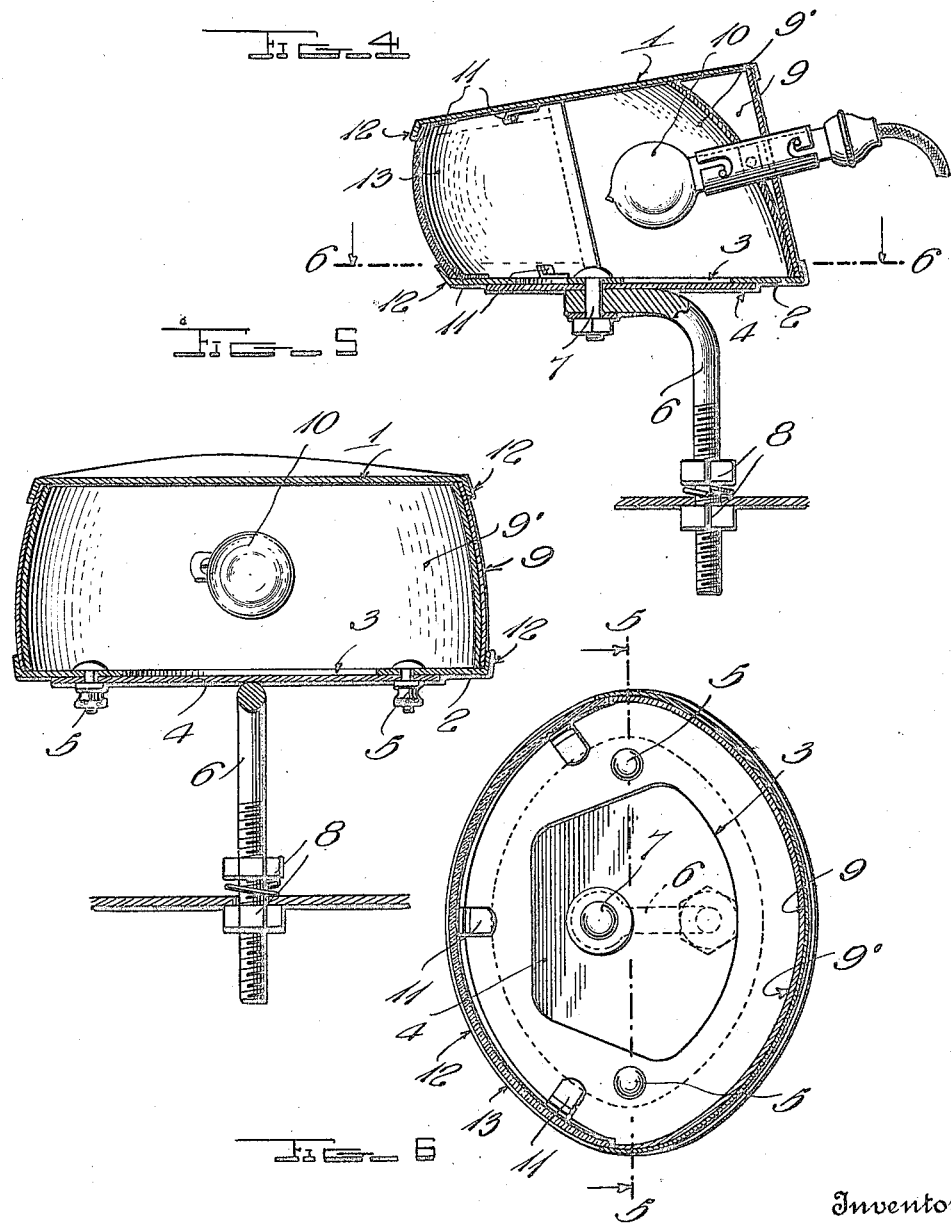
Inventors
C. D. Chandler
F. B. Roland
By
Attorneys

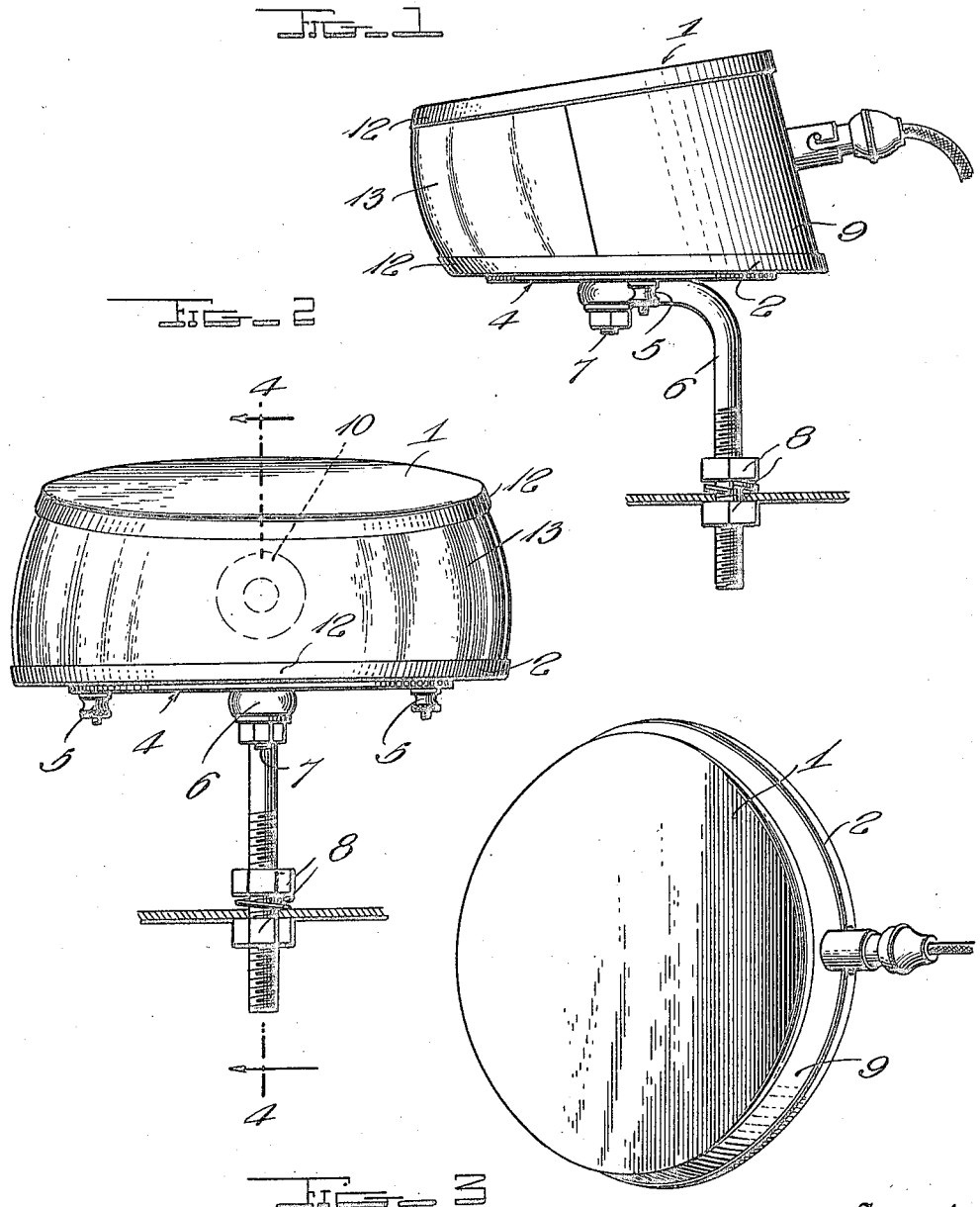

UNITED STATES PATENT OFFICE.

CHARLES D. CHANDLER AND FRED B. ROLAND, OF PORTLAND, OREGON.

HEADLIGHT.

1,403,291. Specification of Letters Patent. Patented Jan. 10, 1922.

Application filed December 16, 1920. Serial No. 431,194.

*To all whom it may concern:*

Be it known that we, CHARLES D. CHANDLER and FRED B. ROLAND, citizens of the United States, residing at Portland, in the county of Multnomah and State of Oregon, have invented certain new and useful Improvements in Headlights; and we do declare the following to be a full, clear, and exact description of the invention, such as will enable others skilled in the art to which it appertains to make and use the same.

This invention relates to an improved headlight for use in connection with an automobile or other motor vehicle, and one object of the invention is to provide a headlight so constructed that the lights from the same may be prevented from striking the eyes of a person approaching the automobile and to further so construct the headlight that the lights from the same may be directed straight ahead and toward the side, the rays of light which are directed straight ahead being directed down toward the road so that the roadway will be well illuminated and as previously stated the lights prevented from being thrown into the eyes of a person approaching the automobile.

Another object of the invention is to so construct this headlight that the plate which constitutes the reflector will extend partly about the side portions of the headlight and will serve to direct portions of the light toward the sides of a road.

Another object of the invention is to so construct this reflector that the portion in front of the rear wall will direct the rays of light forwardly and downwardly.

Another object of the invention is to so construct this headlight that it may be turned to properly direct the rays of light and to further so construct it that the main body portion of the headlight may be removed from a plate which closes an opening in the lower portion of the body and is pivotally connected with a supporting arm.

This invention is illustrated in the accompanying drawings, wherein:

Figure 1 is a front elevation of the headlight in side elevation.

Figure 2 is a front elevation of the headlight.

Figure 3 is a top plan view of the headlight.

Figure 4 is a vertical sectional view taken along the line 4—4 of Fig. 2.

Figure 5 is a sectional view taken along the line 5—5 of Fig. 6.

Figure 6 is a horizontal sectional view taken along the line 6—6 of Fig. 4.

This improved headlight is provided with a body portion having an upper plate 1 and a lower plate 2, the lower plate being provided with a cutout 3 which is normally closed by a removable closure plate 4 releasably held in place by the fasteners 5. This closure plate rests upon the bent upper end portion of a bracket 6 which constitutes a supporting post and the plate is removably connected with this supporting post or standard by means of a bolt 7 which not only serves as a releasable fastener but also constitutes a pivot pin thus permitting the headlight to be turned to properly direct the light. This standard or post may be connected with the automobile in any suitable manner but in the present illustration the post is threaded and carries securing nuts 8 for engaging the upper and lower faces of a mud-guard through which the post is passed.

The upper and lower plates 1 and 2 are substantially elliptical in shape and have their rear edge portions connected by a wall 9 in front of which is placed a reflector 9' for the lamp 10 positioned at approximately the center of the wall 9. This light 10 is in the form of an electric bulb which is carried by a conventional type of socket having conductor wires connected therewith. From an inspection of the drawings, it will be seen that the lower plate is larger than the upper plate and extends rearwardly of the same, the wall 9 and reflector 9' at the rear of the headlight or, in other words, the intermediate portions of the wall and reflector being inclined forwardly from the lower plate to the upper plate and therefore this portion of the reflecting wall will tend to direct the rays of the light forwardly and downwardly toward the roadway. A glaring light will thus be prevented since the rays of light are directed downwardly instead of straight ahead or upwardly. The end portions of the rear wall and reflector wall at the sides of the headlight extend substantially perpendicular and it will thus be seen that the rear wall gradually merges from an inclined to a perpendicular. The side or end portions of these walls which are perpendicular and have their lower corner portions bent inwardly to meet the edge portion of the lower plate will tend to direct the rays of light diagonally from the side portions of the headlight toward the sides of the road and towards the center of the road. Certain of the rays from a pair of headlights will meet at approximately the center of the road and therefore the central portion of the road in front of the automobile will be well lighted and there will be no danger of accidents from a driver not being able to see uneven places in a roadway. Clips 11 are carried by the plate adjacent the flanges 12 so that the glass 13 which is convex and forms a transparent wall or closure at the front of the headlight may be securely held in place.

There has thus been provided a headlight which will be very effective in operation and will brilliantly illuminate the roadway in front of an automobile and also light the side portions of the road without throwing a glaring light in the eyes of a person approaching the automobile.

We claim:

1. A headlight comprising a body having upper and lower substantially elliptical plates, a vertical wall connecting the rear portions of said plates and extending to the sides thereof, a transparent closure for the space between the forward portions of the plates extending from one end of the rear wall to the other end thereof, and a reflector plate in front of the rear wall forming a reflector for a lamp in the body and being curved longitudinally and having its intermediate portion inclined forwardly from the lower plate towards the upper plate in spaced relation to the rear wall, the end portions of the reflector plate gradually assuming a substantially perpendicular position and fitting closely against the inner face of the rear wall and the end portions of the rear wall and reflector plate being arcuate vertically and curving from the upper plate to the lower plate.

2. A headlight comprising a body having upper and lower substantially elliptical plates, a longitudinally curved vertical wall connecting the rear portions of said plates, and a transparent closure for the space between the forward portions of the plates, a wall forming a reflector for a lamp in the body and being curved longitudinally and having its end portions and lower edge portions fitting closely against the inner face of the rear wall and its intermediate portion curving upwardly and forwardly to the upper plate in spaced relation to the rear wall, the intermediate portion of the reflector wall providing a reflecting surface directing light forwardly and downwardly and the end portions of the reflector wall providing reflecting surfaces directing the light diagonally from the side portions of the headlight.

3. A headlight comprising a body having upper and lower substantially elliptical plates, the lower plate being horizontally disposed and the upper plate being inclined forwardly and downwardly and in staggard relation to the lower plate, a vertical wall connecting the rear portions of said plates, a transparent closure for the space between the forward portions of the plates extending from one end of the rear wall to the other end thereof, and a wall forming a reflector for a lamp in the body fitting against the inner face of the rear wall and having its intermediate portion curved forwardly from the rear wall to provide a reflecting surface directing light forwardly and downwardly, the end portions of the reflecting wall directing the light outwardly from the side portions of the headlight.

In testimony whereof we have hereunto set our hand.

CHAS. D. CHANDLER.
FRED B. ROLAND.